United States Patent [19]

Impink, Jr.

[11] 4,208,247
[45] Jun. 17, 1980

[54] NEUTRON SOURCE

[75] Inventor: Albert J. Impink, Jr., Murrysville Borough, Pa.

[73] Assignee: Westinghouse Electric Corp., Pittsburgh, Pa.

[21] Appl. No.: 824,596

[22] Filed: Aug. 15, 1977

[51] Int. Cl.² .................................................. G21C 17/00
[52] U.S. Cl. ................................. 176/19 R; 176/36 R; 176/86 R
[58] Field of Search ....................... 176/15, 36, 86, 28, 176/29, 19 R

[56] References Cited

U.S. PATENT DOCUMENTS

| 2,936,277 | 5/1960 | MacNeill | 176/86 R |
|---|---|---|---|
| 2,952,600 | 4/1960 | Newson | 176/86 R |
| 3,198,709 | 8/1965 | Macomber | 176/86 R |
| 3,269,915 | 8/1966 | Ransohoff | 176/15 |
| 3,396,077 | 8/1968 | Bodnarescu | 176/15 |
| 3,523,869 | 8/1970 | Hilborn | 176/86 R |

OTHER PUBLICATIONS

Nuclear Engineering Handbook, 11/11/58, H. Etherington, McGraw-Hill Book Co., N.Y., pp. 8-25-8-27, 8-49-8-50, AEC., TID-4500, JLI-2748-0-7, 6/4/64, p. 66.

Primary Examiner—Samuel W. Engle
Assistant Examiner—S. A. Cangialosi
Attorney, Agent, or Firm—Edward L. Levine; Z. L. Dermer

[57] ABSTRACT

An improved neutron monitoring and startup source for a thermal nuclear reactor including a fast neutron emitting material encapsulated within a cladding substantially black to thermal neutrons. In another embodiment the inventive source, or any source, is advantageously affixed to movable control elements so as to reside out of the reactor core for periods of high neutron flux.

4 Claims, 6 Drawing Figures

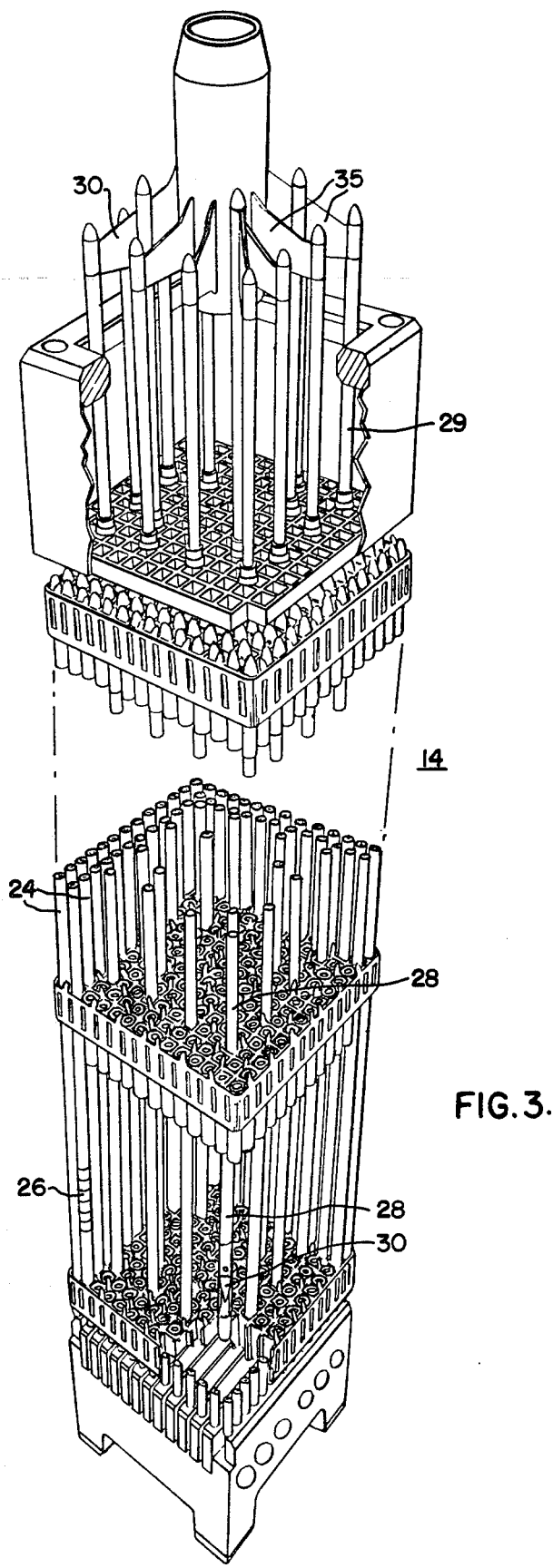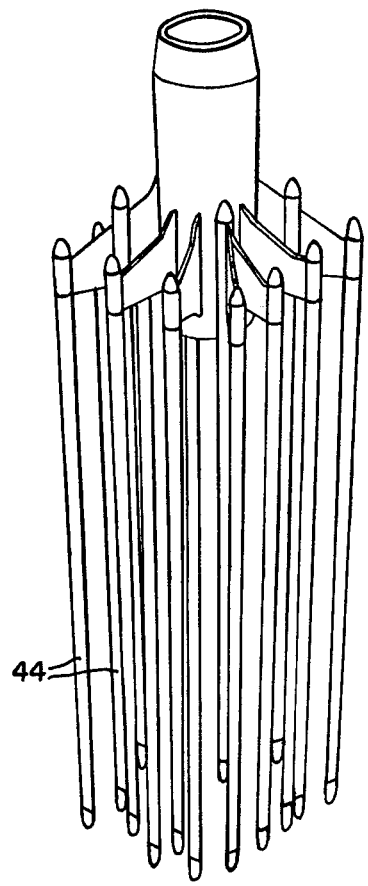
FIG. 3.
FIG. 4.

NEUTRON SOURCE

BACKGROUND OF THE INVENTION

1. Field of the Invention:

This invention relates to nuclear reactors, and more particularly to neutron emitting sources utilized for monitoring reactor neutron flux and for core startup purposes.

2. Description of the Prior Art:

In order to start up a nuclear core, a neutron source or emitter is typically utilized. The sources used have included those referred to as "primary sources" and "secondary sources". Primary sources are those which are made of neutron emitting isotopes in the form in which they are initially placed in the reactor core. Secondary sources are those which are made of initially non-neutron emitting materials, which become neutron emitters during operation of the reactor core. Typical of the materials utilized for sources are those including combinations of polonium and beryllium, plutonium and beryllium, antimony and beryllium, americium-beryllium and curium, and sources including californium. These sources can be relatively expensive. Because secondary sources are irradiated in-core, they are typically less expensive than the primary sources.

In addition to performing a start-up function, the sources are utilized during core shutdown to ensure the operability of monitoring and detection apparatus, such as neutron detectors aligned with the reactor core and positioned outside of the reactor vessel. This is in accordance with governmental regulations applicable to the nuclear industry which dictate that means must be provided for monitoring or otherwise measuring and maintaining control of the fission process under all operating conditions, including shutdown.

Accordingly, neutron sources for commercial reactors have been positioned within the nuclear core, and remain within the core, during at least one entire operating cycle. The sources maintain a fixed position. Small test reactors have also utilized sources driven through a hollow shielded tunnel up into the test core, which are subsequently removed at power operation. In the larger reactors, sources are inserted in selected fuel assemblies and extend within fuel assembly guide thimbles designed to receive control elements. They are therefore inserted within fuel assemblies positioned so as not to receive a control element. They are also disposed in assemblies close to the core periphery so as to be positioned close enough to activate the detection and monitoring apparatus outside of the reactor vessel. As the sources remain within an assembly for an entire core cycle, the primary sources, excluding those of californium, burn out within several fuel cycles when exposed to the high neutron flux during power operation. Californium sources have experienced longer life. In other terms, the sources are consumed by neutron induced fission and transmutation, as well as being mechanically damaged by heat, when exposed to the intense neutron flux levels characteristic of power operation.

As replacement of primary sources is costly, the secondary sources activated under the high neutron flux are used as replacements. The procedure, however, is costly not only in terms of initial source cost, but also in terms of the time and effort expended to reshuffle any type of source during maintenance or refueling operations. There is also a risk of mechanical damage of a secondary source during handling at refueling, and resulting extended down time.

It is therefore desirable to provide neutron sources for nuclear reactors which alleviate costs and time associated with replacement. The sources should desirably have an extended useful life, require minimum reshuffling, and provide adequate neutron emissions for both start-up and monitoring functions.

SUMMARY OF THE INVENTION

This invention provides an improved neutron source for a thermal nuclear reactor and also an arrangement for utilizing a neutron source in a thermal nuclear reactor, each of which provides an extended useful life. In a preferred embodiment the source includes a radioactive fast neutron emitting material, preferably a combination of plutonium-238 and beryllium, encapsulated in a structurally sound alloy which is essentially black to thermal neutrons, but not to neutrons in other energy ranges. Alloys including cadmium are preferred. As plutonium-238 has a relatively long high-life, approximately 89 years, if protected from the high neutron flux within a reactor it can be utilized as an alpha particle emitter for substantially the life of the plant. The essentially black alloy does protect the plutonium-238 from the high thermal neutron flux. Alpha particles emitted spontaneously by the plutonium-238 react with beryllium nuclei which undergo ($\alpha$, n) reactions, thereby emitting fast neutrons which pass through the cadmium alloy cladding. The neutrons activate the exvessel neutron detectors.

Another embodiment of the invention also includes a unique arrangement providing movable positioning of the inventive, or any, neutron emitting source. A source is affixed to a reciprocating control element which passes into and out of the core, and is particularly affixed to a control element which is raised above the core during power operation and which remains in the core at shutdown. Therefore, during periods of high neutron flux, at power, the sources remain above the core elevation and the area of high flux. The sources can be incorporated in portions of selected control elements or rods which maintain the source at the higher position at the times of high flux, such as the control elements known in the art as "first bank" or "shutdown" rods. At shutdown, the sources are alignable with the detection apparatus which is external to the vessel and aligned with the core, so as to cintinually activate the detection apparatus.

BRIEF DESCRIPTION OF THE DRAWINGS

The advantages, nature and additional features of the invention will be better understood from the following description, taken in connection with the accompanying drawings, in which:

FIG. 3 is a perspective view of a fuel assembly having a control element inserted therein;

FIG. 4 is a perspective view of a neutron source insertable into a fuel assembly;

DESCRIPTION OF THE PREFERRED EMBODIMENTS

Figure 1:
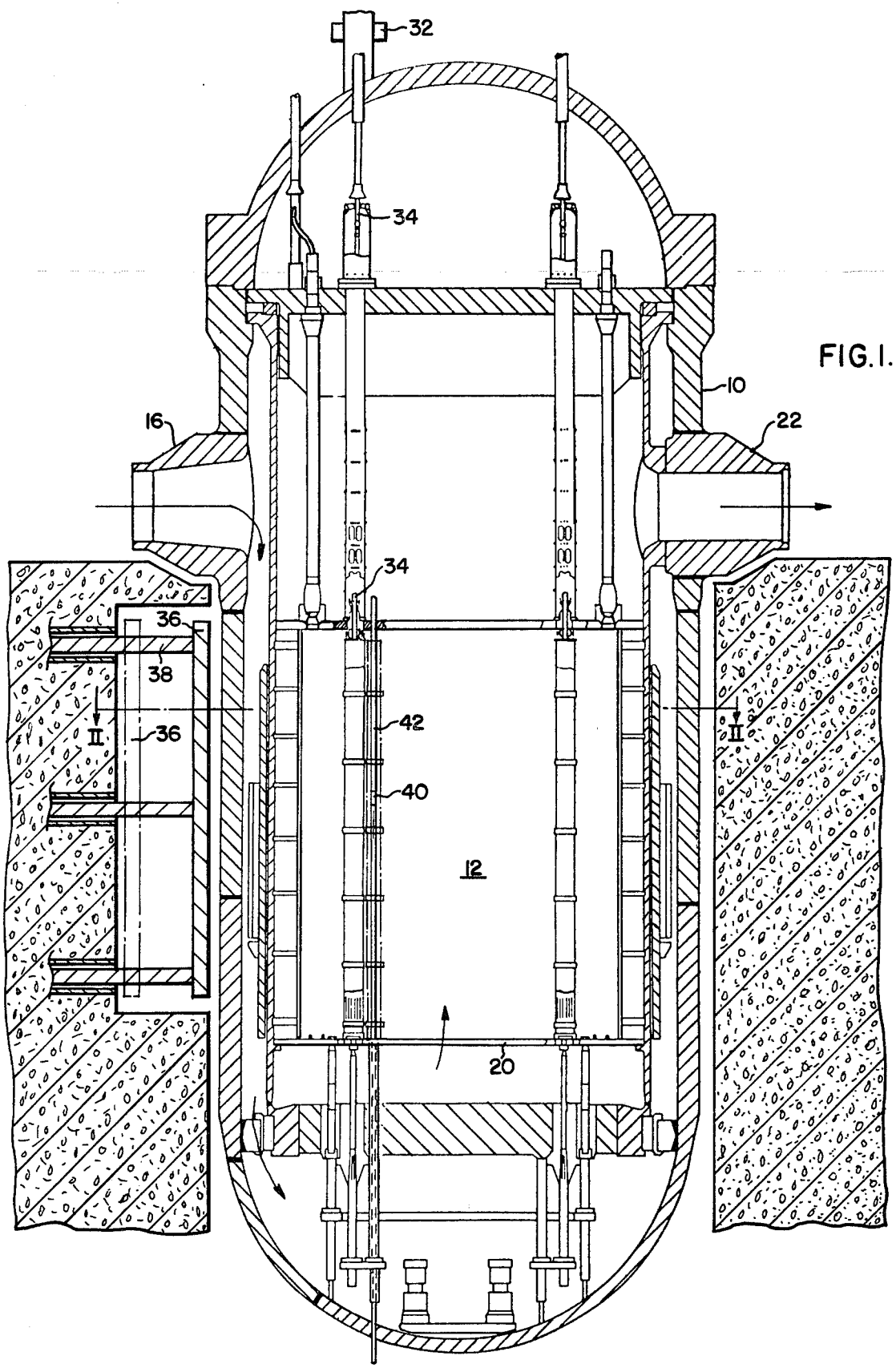
FIG. 1 is an elevation view, partially in section, through the reactor vessel of a nuclear reactor.

Referring now to FIG. 1, there is shown a typical thermal nuclear reactor including a sealed reactor vessel 10 housing a nuclear core 12 comprised of a plurality of fuel assemblies 14. A reactor coolant, such as one including water, enters the vessel through inlet nozzles 16, passes downward in an annular region between the vessel and a core support structure, turns and flows upward through a perforated plate 20 and through the core 12, and is discharged through outlet nozzles 22. The heat energy imparted to the coolant while passing through the core is then transferred in apparatus, not shown, ultimately for the purpose of electric power generation. The reactor coolant serves as a moderator to thermalize neutrons for the fission process.

A fuel assembly 14 is shown in FIG. 3, and includes a plurality of fuel pins 24, containing nuclear fuel pellets 26, arranged in a bundle. The assembly also includes a plurality of guide thimbles 28 which provide skeletal support for the assembly and which are sized to removably receive control rods 29 of elements 30, positionable above and within the core area by means such as electromagnets 32 which act upon shafts 34 (FIG. 1) removably connected to the elements 30. A control element 30 can include one or more control rods 29. Although a "spider-type" control element is shown, including webs 35, it will be understood that many other control element and control rod configurations, including rods, bars, X-shaped and so forth, are compatible with the teachings of this invention. The control elements 30 are typically comprised of a material black to thermal neutrons, such as alloys of tantalum, silver, indium and cadmium, or boron carbide ($B_4C$) elements sealed within a cladding. The control elements 30 are reciprocatingly insertable into the core, between or within fuel assemblies, to control the neutron flux and hence the reactor power output. Typically the control elements 30 include those referred to as "full-length", having neutron absorbing material along their entire length, or "part length" having neutron absorbing material only along their bottom portions.

The neutron flux within the core is continuously monitored by detection apparatus such as the neutron detectors 36 (FIG. 1) which are located at an elevation aligned with the elevation of the core 12. The detectors, located external to the vessel, may be fixed or laterally movable by positioning bars 38. The detectors must be operable under substantially all reactor conditions, including shutdowns for maintenance and refueling.

Neutron flux detection is also accomplished on an intermittent basis by use of movable flux detectors 40 which are inserted at a predetermined rate into thimble tubes 42 which are removably positionable within the core 12 and within selected fuel assemblies 14. The thimble tubes 42, in accordance with an embodiment of this invention, are extendable above the core 12.

The guide thimbles 28 of the fuel assemblies 14, in addition to receiving control rods 29, are sized to receive neutron sources 44. A typical source is shown in FIG. 4. In the prior art, the sources are, for example, shaped similar to the control rod spider element 30, but have a shorter length.

Figure 5:
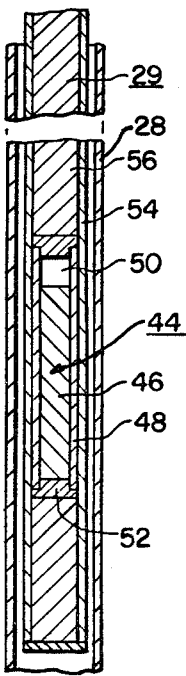
FIG. 5 is an elevation view, in section, of a neutron source and control element in accordance with this invention.

The arrangement of a neutron source 44 in accordance with one embodiment of this invention is shown in FIG. 5. The source includes a fast neutron emitting material 46, sealingly encapsulated in a cladding 48 essentially black to thermal neutrons. The preferred source material 46 is a combination of plutonium-238 and beryllium, and the preferred cladding 48 includes cadmium, such as a combination of silver, indium and cadmium. The plutonium-238, which has a half-life of approximately 89 years, emits alpha particles. The alpha particles strike the beryllium, and result in ($\alpha$, n) reactions, emitting fast neutrons. The fast neutrons can readily pass through the cladding and may be thermalized in the surrounding medium or can continue through the reactor vessel to activate the neutron detectors 36.

Cadmium is preferred as the source cladding 48 as it significantly reduces neutron-induced heat generation within the source 44. The heat generation results primarily from fission of plutonium-238 nuclei by thermal and resonance energy neutrons that penetrate the cladding 48 during power operation. Preliminary calculations indicate that the heat generation rate due to fissioning of plutonium-238 by low energy neutrons in, for example, a 100 curie source will be reduced to an acceptable maximum of 20 watts by encapsulation in cladding 48 having a wall thickness as shown in Table I. Pure cadmium is listed for comparison purposes only, as the melting point of cadmium, 321° C. (610° F.), limits its structural integrity within a reactor environment. The relative percentages of the compounds are given by weight, and although adding up to 100%, do not preclude some impurities.

TABLE I

| Cladding Material | Required Thickness, Inches |
| --- | --- |
| Cadmium | 0.008 |
| 65% Silver, 35% Cadmium | 0.023 |
| 80% Silver, 15% Indium, 5% Cadmium | 0.075 |

The source 44 also preferably includes a plenum 50 within the sealed cladding 48, in flow communication with the source material 46. The plenum 50, or void space, serves to collect gas within the source, most particularly helium resulting from the emitted alpha particles. The cladding 48 can be sealed in a variety of manners, including the use of welded end plugs 52. The described neutron source will have an extended life relative to prior art sources as a result of the long half-life of plutonium-238 and the protection afforded the plutonium by the cadmium cladding.

However, the life of the described source, or prior art sources, can be further extended if the source does not reside in the core region 12 continuously throughout a fuel cycle. Another embodiment is an arrangement which provides an extended life, and is shown in FIG. 5. The neutron source 44, or any source, is here affixed to a control rod 29 or control element 30, which is slidingly movable within the core region. The rod 29 can specifically be received within one of the tubular guide thimbles 28 of a fuel assembly 14. Preferably the source 44 is sealed within a control rod cladding 54, which also seals a neutron absorbing control material 56 as well known in the art.

Figure 6:
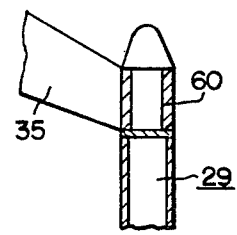
FIG. 6 is an elevation view, in section, of an embodiment of the invention.

As the control rods or elements are reciprocatingly inserted and withdrawn from the reactor core 12 in order to control reactor power and shutdown reactivity, a neutron source affixed to an element insertable at shutdown conditions and withdrawn at power operation will extend the source operating life. Additionally, as indicated by FIG. 6, a singular rod 29 can be separately fabricated and field assembled to a complete control element 30. The rod 29 can, for example, be field welded to the web 35 or a web receptacle 60. It will be apparent that the extended life benefit provided by the incorporation of a source with a control means is applicable to other source types including those of the prior art, in addition to the preferred source disclosed.

Figure 2:
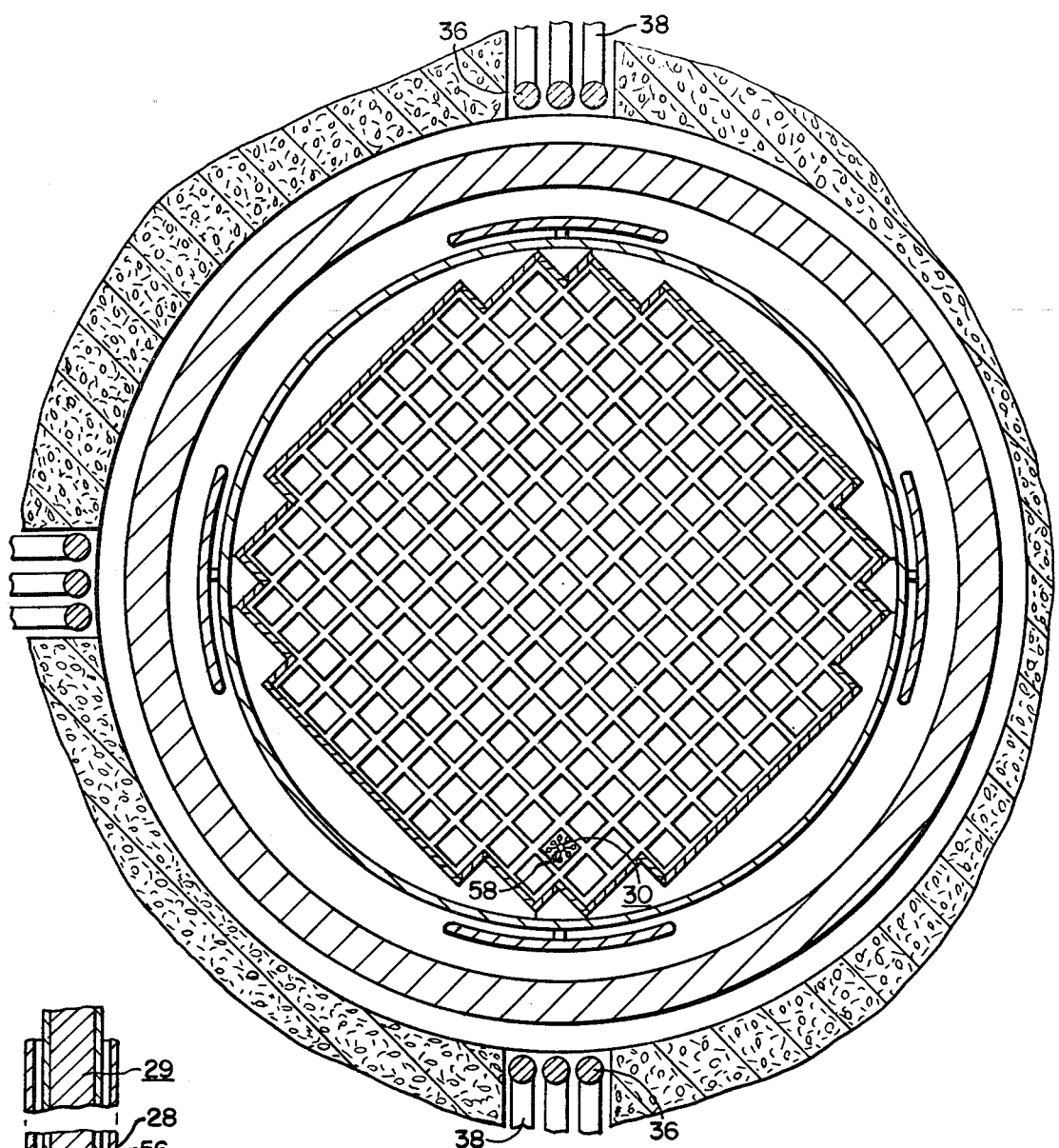
FIG. 2 is a plan view taken at II—II of FIG. 1.

Dependent upon the strength of the source and the configuration of the core and the surrounding components, the source 44 is radially positioned so as to activate the detectors 36 at low power. Typically a source can be included in one or more of the outermost rods 58 of a radially outermost control element 30, as shown in FIG. 2. The control elements utilized are preferably within the boundary of the outer three rows of fuel assemblies within the exemplary core.

It will also be apparent that the control elements 30 including neutron sources, for example, two in a reactor core, can advantageously be interconnected to the balance of the control elements and reactor control systems to achieve desired operational movements. For example, when the reactor is subcritical, the source-bearing control elements can be electrically disconnected from the normal control banks or groups with which they are associated to avoid potential inadvertent movement of the sources and disruption of neutron flux level monitoring. During an approach to criticality, the source-bearing elements would remain disengaged, and within the core, while shutdown and first control groups are withdrawn from the core to establish criticality. The flux level accordingly increases to well above the minimum source level range during this operation. At this point, the source bearing elements should then be withdrawn to form a normal operating configuration, and electrically connected to the normal control means. Alternatively, a separate source shutdown control element group, including the source-bearing elements, can be defined within the normal control element programming control system.

Additional uses of the inventive teachings can easily be visualized. For example, the source 44 can be used for calibration of the movable flux detectors 40. This can be accomplished by orienting a thimble tube 42 proximate a control element 30 including the neutron source. The thimble tube 42 would be inserted so that its extremity rises above the top of the core, and the movable detector inserted to also rise above the core. The neutron source can then be laterally aligned with the movable detector 40, and used as a source of calibration for the detector 40.

It will be apparent that utilization of the inventive teachings provides distinct advantages over prior art neutron sources. The invention permits reduction of secondary source use with an associated reduction in operating costs and core complexity. It can eliminate the need for special orificing which has been required when fixed neutron sources are placed in fuel assemblies. A combination neutron source and control element also markedly reduces the neutron and gamma radiation exposure of the source and improves its long term mechanical integrity. Refueling procedures are also simplified by reducing the number of components which must be handled. And, in addition to extending the life of neutron emitting sources, the teachings can also be utilized for calibration of movable in-core flux detectors.

It will be further apparent that additional modifications and benefits are possible in view of the above teachings. It therefore is to be understood that within the scope of the appended claims, the invention may be practiced other than as specifically described.

I claim:

1. A thermal nuclear reactor including a core, neutron detecting means disposed externally of said core, and a control element selectively positionable within said core, said control element comprising a plurality of rods of a material substantially black to thermal neutrons encased in a sealed cladding, one of said rods also including a spontaneous fast neutron emitting source encapsulated in said said material substantially black to thermal neutrons, said source being of sufficient strength to emit neutrons detectable by said detection means upon shutdown of said reactor and location of said control element within said core.

2. A thermal nuclear reactor comprising:
   a. a reactor vessel;
   b. a neutron detector disposed externally of said vessel;
   c. a spontaneous fast neutron emitting source and control element rectilinearly movable within said vessel, said element including a neutron source which spontaneously emits fast neutrons through ($\alpha$,n) reactions of sufficient strength to be detected by said detector, said source being encapsulated within a sealed enclosure, said enclosure also bounding a plenum in fluid communication with said source, and a sealed cladding encapsulating said enclosure, said cladding also bounding a neutron absorbing control material substantially black to thermal neutrons, said neutron absorbing control material encapsulating said neutron source and said enclosure; and
   d. a plurality of vertical coextending fuel assemblies arranged within said vessel to form a nuclear core, one of said assemblies having a guide tube for slidingly receiving said neutron source and control element.

3. The reactor of claim 2 including means for controlling the position of said neutron emitting source and control element such that said source is selectively positionable within said core at power levels below a preselected value and positionable out of said core at power levels above a preselected value, and at least a portion of said substantially black material is positionable within said core when said source is either within or out of said core.

4. A control element adapted for a thermal nuclear reactor having a core, an ex-core neutron detector, and means for reciprocatingly inserting said element into said core comprising:
   an elongated structure of neutron (n) poison material along a substantial portion of its length, said poison material being substantially black to thermal neutrons, a minor portion of said elongated structure including a spontaneous fast neutron emitting source encased in a material substantially black to thermal neutrons and substantially transparent to neutrons in other energy ranges, said source emitting neutrons of sufficient strength to be detected by said detector while said reactor is in a shutdown condition, said neutron emitting source comprising plutonium-238 and beryllium, whereby plutonium-238 spontaneously emits alpha ($\alpha$) particles which react with the beryllium in an ($\alpha$,n) reaction to spontaneously produce said fast neutrons.

* * * * *